Figure 1:
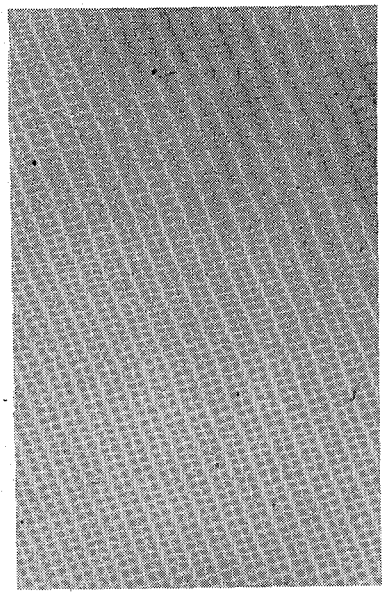

Jan. 31, 1967    F. J. MARUSAK    3,301,649
METHOD OF MAKING HIGH STRENGTH GLASS ARTICLES
Filed March 10, 1964

INVENTOR.
Francis J. Marusak
BY Milton Peterson
ATTORNEY

United States Patent Office

3,301,649
Patented Jan. 31, 1967

3,301,649
METHOD OF MAKING HIGH STRENGTH
GLASS ARTICLES
Francis J. Marusak, Corning, N.Y., assignor to Corning
Glass Works, Corning, N.Y., a corporation of New
York
Filed Mar. 10, 1964, Ser. No. 350,787
5 Claims. (Cl. 65—30)

This invention relates to surfaced glassware, particularly flat glass, having increased strength. It is especially concerned with the surfacing of glass prior to strengthening by chemical tempering. The invention is described with reference to flat glass because of a traditional association between flat glass and surfacing, but is in no way limited to this type of glass article.

Flat glass is customarily produced by withdrawing a continuous stream of molten glass from a furnace reservoir. This is converted, by rolling or drawing, into a continuous sheet or ribbon which is annealed to remove strains prior to further processing. At this stage, the opposed faces of a sheet or ribbon of flat glass normally have a slight waviness or unevenness that is sufficient to cause distortion of visibility in vehicle or architectural closures.

It is customary therefore to surface such glass by grinding the faces to produce parallelism and then polishing to restore transparency. Traditionally, grinding has involved passing the continuous sheet of glass, or individual portions bedded in plaster, under an extended series of grinding wheels, known as runners. Progressively finer grained abrasive, such as sand, is introduced between the glass and the runners to remove glass by abrasion and thereby produce "smoothed" or parallel faces. The "smoothed" glass sheet is then subjected to a series of polishing heads or discs with a much finer abrasive such as rouge. This polishes the rough ground surface and thereby restores transparency to the glass sheet.

There are numerous possible variations and modifications in the surfacing technique. For example, one may chemically surface glass with etching agents, either alone or in combination with abrasive material. One may also employ different abrasive materials, either between the moving heads and the glass or embedded in the face of the grinding heads. In accordance with one proposal, a series of grinding wheels provides the abrasive action on a glass sheet by means of diamond particles embedded in a bonding matrix, the particles ranging in means particle size from about 275 microns to about 10 microns and the initial grinding heads containing the coarsest particles.

In addition to visibility characteristics, flat glass products, such as architectural and vehicle closures, frequently require increased mechanical strength, that is resistance to fracture or breakage by impact or bending. By way of illustrating such requirements, reference is made to the American Standard Safety Code requirement for automobile side windows. In accordance with this code requirement, an edge supported, 12" x 12" square of glass must withstand the impact of a ½ lb. ball dropped from a height of 10 feet onto a face of the glass sheet.

Heretofore, a combination of thermal tempering and a glass sheet thickness of about ¼" has been utilized in order to produce windows capable of meeting such requirements. However, recently developed chemical tempering techniques provide strength increases of sufficient magnitude to enable meeting code requirements with flat glass products having a thickness under 0.100". This is particularly true of the low temperature ion exchange technique wherein ions of larger ionic diameter are exchanged for smaller ions within the glass surface at temperatures below the annealing range to create a compression layer on the glass. Such a strengthened, flexible, transparent, flat glass product opens up broad new vistas of design and form, particularly in the automotive industry.

However, extremely erratic results were encountered when attempts were made to realize this strengthening potential in commercially surfaced flat glass. The glass employed was of a composition known to be particularly adapted to low temperature chemical tempering, and corresponding unsurfaced glass strengthened in a predictable manner. It thus became apparent that the ability to realize the chemical strengthening potential of the glass was in some way interfered with during the surfacing operation.

I have now discovered that this erratic behavior in surfaced flat glass is the result of subsurface defects in the nature of microchecks. I have further found that these subsurface microchecks are customarily present in ordinary polished flat glass, but are not readily observed even under magnification. Thus, a polished glass surface may appear optically clear when visually inspected even with the aid of magnification. However, removal of but a few microinches of surface glass with a light acid etch will produce a visually hazy appearance. Under magnification this appears as a myriad of extremely fine cracks or checks extending into the glass.

The origin of these microdefects has not been conclusively determined. However, it is my belief that they are roots or appendages to macrodefects such as spalls and crushed areas. The latter are produced as the glass is crushed or abraded by large abrasive grains during the initial stages of grinding. Further grinding, followed by polishing, removes sufficient glass so that visible damage to the glass surface is removed and the surface appears optically clear. However, the appended microfractures extend further into the glass and are not removed by ordinary polishing. They apparently become smeared over, or otherwise obscured, during polishing so as not to be apparent in polished glass except after etching.

I have further found that predicted high strength values can be imparted to surfaced flat glassware of appropriate composition providing such defects are effectively eliminated from the glass. One means of accomplishing this is to simply extend the polishing operation for a sufficiently long time. However, the length of the polishing operation may be shortened by properly selecting grinding and polishing materials. For example, garnet grinding and cerium oxide polishing, as is frequently used in optical lens practice, may reduce the time required to produce an adequate surface for effective chemical tempering. However, such practices involve rather sizable increases in processing costs which are quite undesirable from a commercial standpoint.

Further investigation reveals that the tendency to erratic strengthening in surfaced flat glassware can be greatly diminished by substituting diamond grinding for conventional sand grinding. The former appears capable of providing a more uniform abrasion which minimizes major surface defects having relatively deeply extended microchecks. In any event, it has been found that the normal capability of flat glass to be chemically strengthened can be substantially retained by diamond grinding followed by sufficient polishing to remove about 300 microinches of surface glass.

Based on these various findings and discoveries, my invention resides in an alkali metal silicate type glass article having a smoothed surface that is substantially free from subsurface defects visible under 100× magnification, and further having a compressively stressed surface layer produced by chemical tempering, preferably by replacement of original alkali metal ions in the glass by ions of larger ionic diameter. The invention further resides in a method of producing such a glass article having increased resistance to impact which comprises removing surface glass from the article to produce a smooth surface that is substantially free from defects that are visible under 100× magnification after light etching, and thereafter chemically strengthening the article by introducing into its surface ions of larger ionic diameter in exchange for the alkali metal ions of the glass thereby developing a compressively stressed layer of glass. Preferably, the surface glass is removed by diamond grinding followed by polishing to remove glass to a depth of at least 300 microinches.

For purposes of the invention, a glass article may be formed in accordance with any known and appropriate glass-forming technique. The article is formed from a silicate glass containing replaceable alkali metal ions for exchange purposes. It is desirable that a silicate glass contain at least 1% lithia ($Li_2O$) or 5% soda ($Na_2O$) by weight for chemical strengthening, although lesser amounts may be somewhat effective. Potassium and rubidium ions are also exchangeable, but the exchange process is currently too slow and expensive to be of practical interest. Preferably a glass contains at least 5% of alumina ($Al_2O_3$) or zirconia ($ZrO_2$) to enhance its strengthening potential. Up to about 20% of other known glass component oxides may be present under certain circumstances. However, they should be used cautiously inasmuch as some oxides tend to depress the chemical strengthening potential of a glass.

The formed glass article is then subjected to a smoothing operation in which a portion of the glass is removed to improve the flatness or parallelism of a surface or surfaces on the article. Traditionally, glass has been smoothed by abrasive grinding followed by polishing to restore an optically clear surface. As mentioned earlier, a glass article smoothed by ordinary mechanical abrasion techniques will normally have subsurface defects which seriously interfere with effective chemical tempering.

In general, chemical tempering includes any process whereby the chemical composition of a surface layer on a glass article is modified to produce a compressively stressed, strengthening layer of glass on the article. High temperature chemical tempering is known to develop a glass layer of relatively low thermal expansion whereby compressive stress is developed when the article is cooled from a temperature above the strain point of the glass. The low temperature technique involves an exchange of relatively large ions for relatively small ions in the glass. It must be carried out without substantial molecular rearrangement and consequent stress release in the glass, thus requiring temperatures below the glass annealing range. The latter technique is generally preferred because of a greater strengthening potential and a minimized opportunity for deformation of the ware.

The chemically tempered article of the present invention may be smoothed in accordance with any available technique. The essential condition is that the "smoothed" surface then be polished to the extent necessary to completely remove the surface defects introduced in smoothing, including the subsurface portions that normally remain after ordinary polishing of abrasively smoothed glassware. These subsurface defects are not ordinarily visible on a polished glass surface even under magnification, but are revealed by lightly etching to remove a few microinches of surface glass.

It is well known to remove a surface layer on silicate glasses with a hydrofluoric acid etch. However, for present purposes, I have found particularly effective a buffered acid solution whereby the normal rate of acid attack is slowed considerably. A particularly suitable solution is prepared by adding 5 milliliters of concentrated sulfuric acid ($H_2SO_4$) and 5 grams of ammonium bifluoride ($NH_4HF_2$) to about 160 milliliters of water. With such a solution an etch ranging in time from several seconds to a few minutes, preferably about one minute, is sufficient to bring out the glass defect pattern. Other strong mineral acids such as hydrochloric acid may be substituted for the sulfuric acid to provide an equivalent source of active hydrogen ions for generation of HF in the solution. Thus, the rate of etching may be varied by varying the amount of such acid in the solution from about one up to about ten milliliters.

Figure 2:
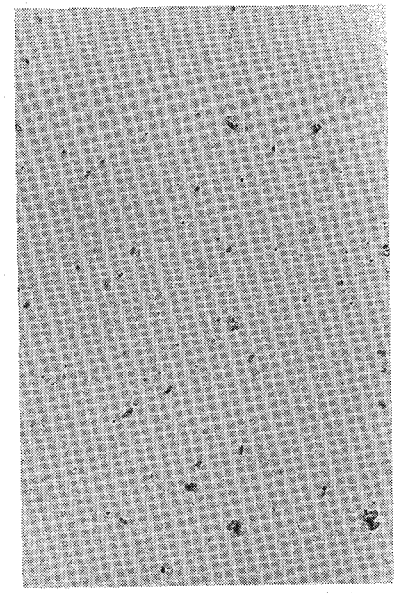
Figure 3:
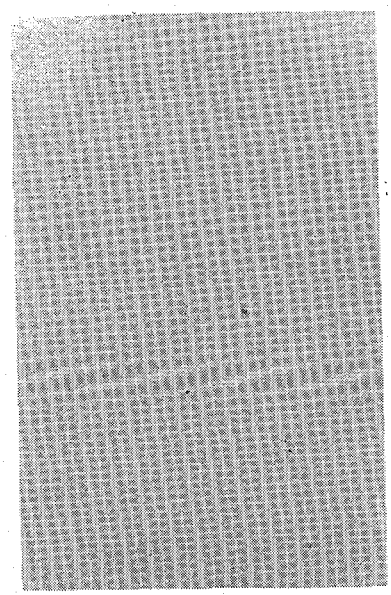
Figure 4:
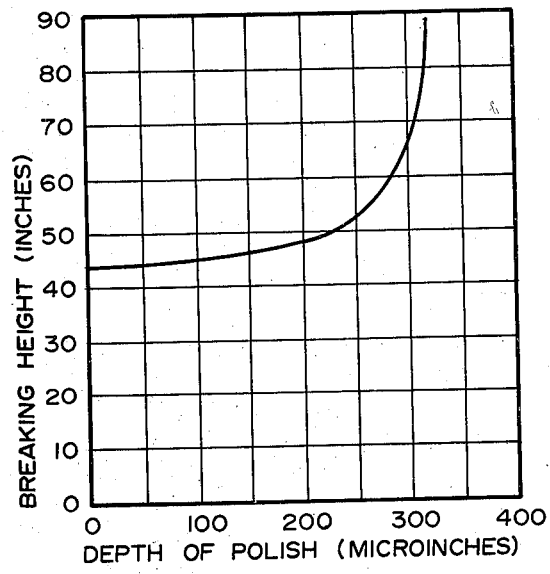

In further describing the invention, reference is made to the accompanying drawing wherein:

FIGS. 1, 2 and 3 are photographic reproductions of magnified glass surfaces, and FIG. 4 graphically illustrates the effect of glass removal by polishing in a preferred embodiment of the invention.

The photographs reproduced in FIGURES 1–3 were taken through the eyepiece of a microscope having a magnification of 100 times. Available evidence indicates that this degree of magnification adequately reveals microchecks that interfere with glass strengthening. To the extent that smaller microchecks or defects may exist, they appear to have little or no effect on glass strengthening potential.

FIGURE 1 depicts a magnified surface on a piece of flat glass which had been surfaced, that is ground and polished, in an ordinary commercial sand grinding operation. This surface was adequately free of visual defects to qualify as acceptable polished window glass. FIGURE 2 depicts a glass surface, as depicted in FIGURE 1, after having been subjected to a one minute light etch as described above. Each of the myriad of fine lines appearing in the picture represents a small microcheck extending into or essentially normal to the glass surface. It will be appreciated that these microchecks actually existed underneath the surface photographed in FIGURE 1. However, they were effectively sealed off or obscured during the polishing process so as not to be visually apparent even in the magnified photograph.

FIGURE 3 is a magnified picture of a glass surface taken in the same manner as FIGURES 1 and 2. The glass was produced from a melt of essentially the same composition and in essentially the same type of melting and forming operation. However, the rolled glass sheet was ground and polished in accordance with the present invention to remove surface glass to a sufficient extent that subsurface defects or microchecks, as seen in FIGURE 2, were essentially eliminated. After such surfacing and prior to mounting in the microscope, the glass specimen was given a light etch in accordance with the procedure employed in preparing the glass specimen of FIGURE 2. It is readily evident that the pictorial representation is an essentially defect free glass surface. Repeated tests with flat glass surfaced in this manner have demonstrated that, under these conditions, the expected increases in strength from chemical tempering can be attained.

By way of further illustrating practice of the invention, particularly the method aspect thereof, the following examples are presented:

EXAMPLE I

An aluminosilicate glass, composed approximately of the following oxides by weight: 65% $SiO_2$, 21% $Al_2O_3$, 5% $Na_2O$, 4% $Li_2O$, 4% MgO and 1% $Sb_2O_3$, was melted in a continuous tank and delivered to a rolling machine. The glass was rolled into a continuous ribbon about 0.140 inch thick and about 4 feet wide. This glass ribbon was annealed and cut into large sheets which were passed under a series of grinding heads on a commercial sand grinding line. Each side of the sheet was ground sufficient to render the surfaces parallel, thereby removing about 0.025 inch of glass from each surface. The glass sheets were then passed under a series of rouge polishing heads to restore transparency to the glass while a layer of about 150 microinches depth was removed from each ground surface. The glass sheets thus polished were optically clear and, when examined under a microscope, presented a surface appearance corresponding to that shown in FIGURE 1 of the drawing.

The surfaced sheets were cut into 12 inch squares. Each square was then immersed for a period of 2 hours in a molten salt bath composed of 85% sodium nitrate ($NaNO_3$) and 15% sodium sulfate ($Na_2SO_4$), the bath temperature being held at 450° C. during this time. The square test pieces were then removed from the bath, cooled and cleaned. Each square was edge mounted in a wooden frame and positioned horizontally for drop ball testing.

In the drop ball test, a ½ lb. steel ball is dropped onto the center of a surface of the edge mounted glass square being tested. The sample is subjected to one drop each at 12 inch incremental heights until such time as breakage occurs. As indicated earlier, the American Standard Safety Code specification requires vehicle side windows to withstand a drop of 120 inches.

The six test pieces described above broke at an average height of 64 inches, or about half that required to pass the window specification. When edges of the glass samples were given a light etch in a buffered acid etching solution and examined under a microscope, they exhibited an appearance similar to that shown in FIGURE 2 of the drawing.

EXAMPLE II

Several additional groups of test squares were produced in accordance with the procedure of Example 1 up to the point of immersion in the molten salt bath for strengthening treatment. At this point, the samples were mounted on a large polishing table and polished with cerium oxide for varying lengths of time. Following this additional polishing, the test squares were cleaned and immersed in the molten salt bath in accordance with Example 1. The test squares were grouped according to repolishing time and subjected to the drop ball test described in the preceding example. The average height of breakage for each set is shown in the table below together with the repolishing time for that set:

Table

| Time (hrs.): | Height (inches) |
| --- | --- |
| 0 | 64 |
| ¼ | 90 |
| ½ | 85 |
| ¾ | 116 |
| 1 | 152 |

From the above data, it is apparent that the particular sand ground samples being tested were rendered satisfactory for vehicle window use by repolishing for a period of about 1 hour. This amount of polishing was sufficient to remove an estimated several hundred microinches of glass from the surface of a sheet and thereby render the sheet essentially free of subsurface microchecks when etched and examined under a microscope.

EXAMPLE III

A set of three 12 inch squares was produced from the glass of Example 1 and surfaced by an optical lens process. In this type of surfacing, garnet of varying particle size is substituted for sand in the grinding step and the ground glass is then polished with cerium oxide rather than rouge for about a quarter hour. The grinding and polishing steps were so timed as to remove approximately the same depth of glass, thereby producing a surfaced sheet essentially comparable in dimensions to the test pieces of the preceding examples.

These three optically surfaced glass squares were edge mounted and subjected to the drop ball test in accordance with the procedure described in Example 1. The average height of breakage was 143 inches. These data clearly indicated that the depth of subsurface damage caused during grinding, and the consequent degree of polishing required to recove such damage, could very markedly depend on the nature of the grinding process and the type of grinding abrasive employed.

EXAMPLE IV

A continuous ribbon of glass was rolled in accordance with Example 1 and cut into large sections. These were ground under grinding heads or runners the operative face of which consisted of individual diamond particles mounted in a soft metal matrix. Thus, the embedded diamond particles provided the abrasive action normally provided by loose abrasive supplied between the grinding head and the glass. In this diamond grinding system, the concentration and size of the diamond particles in successive grinding heads are varied to provide an abrasive action of decreasing intensity thus corresponding in principle to the grinding practice of the traditional loose abrasive technique.

The ground glass sheets thus provided had a thickness of about 0.080–0.085 inch, having had about 0.025–0.030 inch of glass removed from each surface. The ground glass sheets were then subjected to a cerium oxide polishing in the manner described in Examples 1 and 2 above. The polishing action on each glass sheet was for a predetermined time sufficient to remove a specified depth of glass from the surface of the ground sheet. Six inch test squares were then cut from the polished sheets and edge mounted for drop ball testing as in Example 1.

Correlation tests on otherwise essentially identical test samples have demonstrated that the average breakage height for 12 inch squares is greater by a factor of about 2.5 than the breakage height for 6 inch squares. Thus, the actual test results determined on the 6 inch squares should be multiplied by a factor of 2.5 for comparison with the data determined on 12 inch squares in the preceding examples with reference to the window specification.

The following table sets forth average breakage heights in inches for different sets of test squares, each set having been polished for a uniform time to remove the indicated depth of glass from each surface.

| Group | Polish (Microinches) | Height (Inches) |
| --- | --- | --- |
| 1 | 00 | 44 |
| 2 | 200 | 48 |
| 3 | 245 | 52 |
| 4 | 320 | 88 |

The above data is plotted in FIGURE 4 of the drawing. Depth of polish in microinches is plotted along the horizontal axis and breakage height in inches is plotted on the vertical axis. It is readily apparent from the data thus illustrated that a marked change in strengthening characteristics occurs with the removal of about 300 microinches of glass from these diamond ground test pieces. Coincident therewith, polished glass samples of normal 12 inch size become capable of sufficient strengthening to safely and consistently pass the impact requirement for window use. Examination of corresponding polished and etched samples under magnification indicates, as might be expected, a change in appearance. With the removal of about 300 microinches by polishing, the etched surfaces achieve an optically clear appearance such as shown in FIGURE 3 of the drawing.

Further embodiments and modifications of the invention within the scope of the appended claims will become readily apparent from the foregoing description. In particular, various alternative surfacing procedures may suggest themselves. Also, while lithium silicate glass and a replacement of lithium by sodium ions has been described for illustration, other alkali metal glasses, in particular soda glasses wherein sodium ions are replaced by, for example, potassium ions, are also comprehended within the scope of the claims.

I claim:
1. In a method for strengthening a polished alkali silicate glass article to increase its resistance to impact wherein the alkali metal ions in a surface of the glass article are replaced by larger alkali metal ions at an elevated temperature below the glass annealing range, such replacement creating a surface compression layer therein, the improvement which comprises polishing the surface of the glass article, prior to said ion replacement, to a sufficient depth to substantially eliminate microchecks that can be observed under 100× magnification after light etching.

2. A method according to claim 1 wherein said microchecks are the result of the mechanical grinding and polishing of the glass article.

3. A method according to claim 1 wherein said etching is accomplished by a solution having a concentration of HF not greater than about that resulting from adding 5 ml. concentrated $H_2SO_4$ and 5 g. $NH_4HF_2$ to about 160 ml. $H_2O$.

4. A method according to claim 1 wherein said depth of polishing is at least 300 microinches.

5. A method according to claim 1 wherein the composition of the glass includes at least 5% of an oxide selected from the group consisting of alumina and zirconia.

References Cited by the Examiner

UNITED STATES PATENTS

| 2,779,136 | 1/1957 | Hood et al. | 65—30 |
| 3,218,220 | 10/1965 | Weber | 65—30 |

OTHER REFERENCES

Jones: "Latent Milling Marks on Glass," J. of Amer. Cer. Soc., vol. 29, No. 4, April 1946, pp. 108–114.

DONALL H. SYLVESTER, *Primary Examiner.*

G. R. MYERS, *Assistant Examiner.*